No. 799,022. PATENTED SEPT. 5, 1905.
J. C. TUNNICLIFF.
PLANTER.
APPLICATION FILED AUG. 22, 1904.
2 SHEETS—SHEET 1.
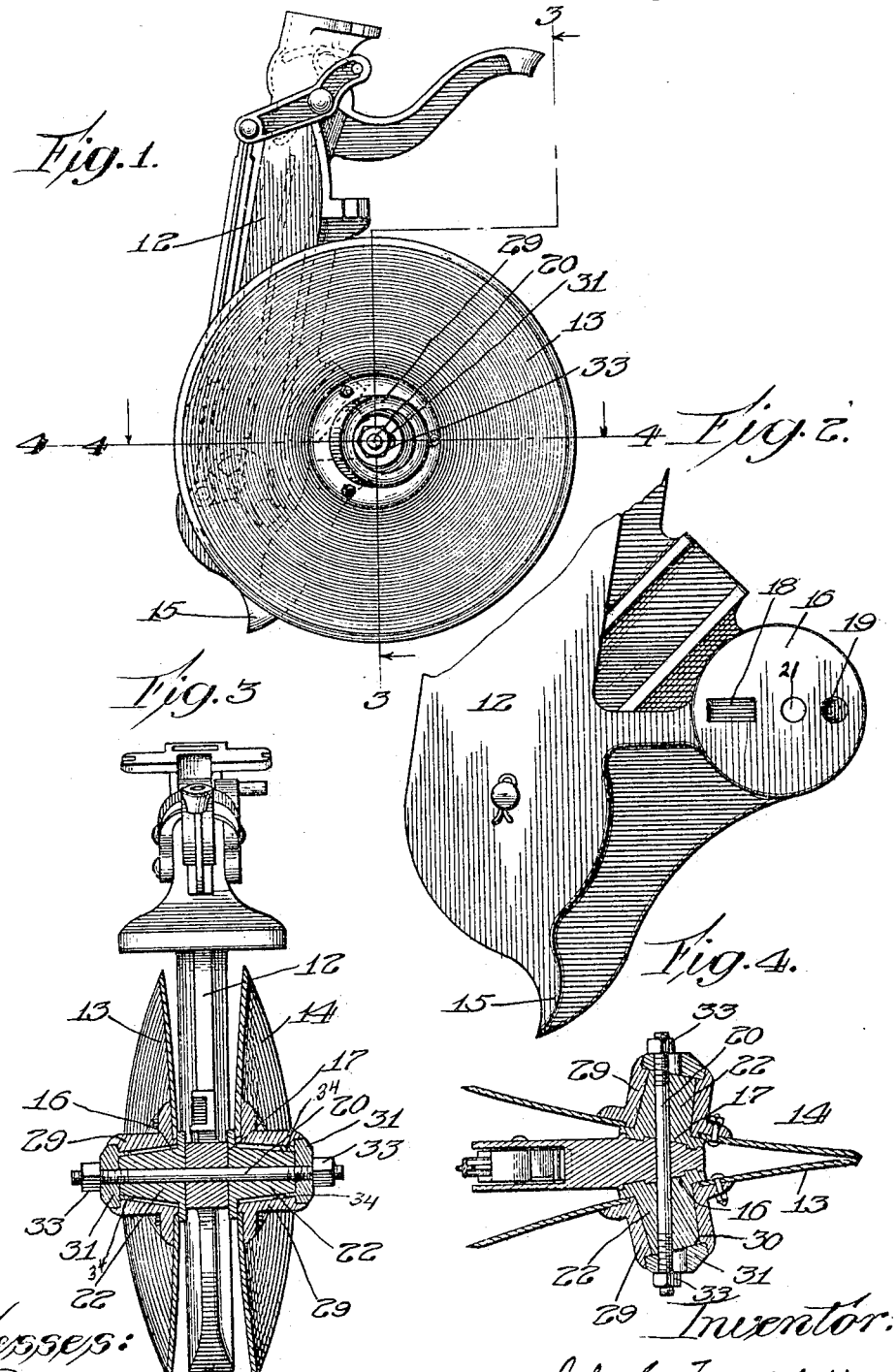
Witnesses:
Inventor:
John C. Tunnicliff,
by Bond Adams Pickard and Jackson,
his Attys.

No. 799,022. PATENTED SEPT. 5, 1905.
J. C. TUNNICLIFF.
PLANTER.
APPLICATION FILED AUG. 22, 1904.
2 SHEETS—SHEET 2.
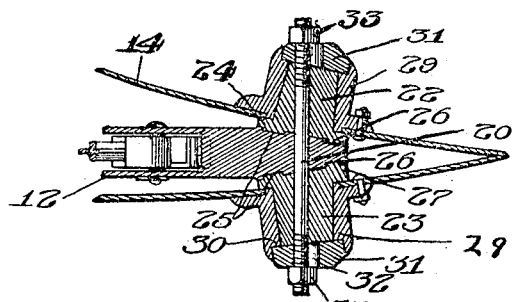
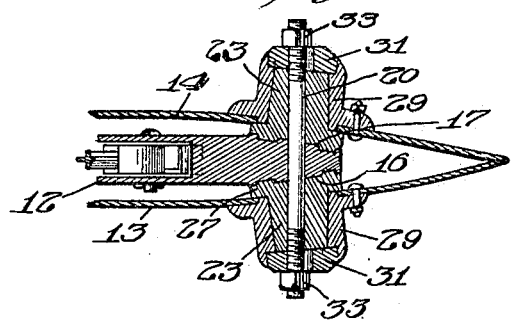
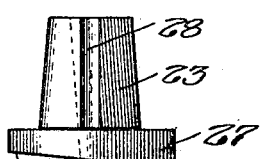
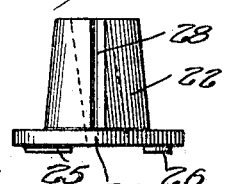
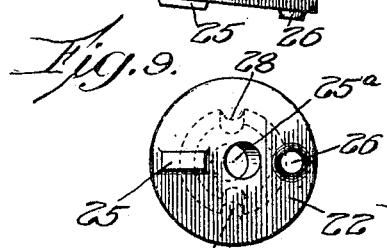
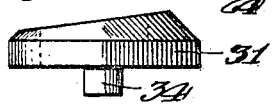
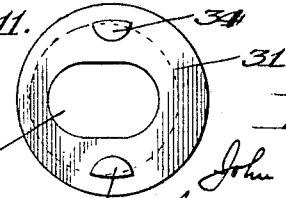

UNITED STATES PATENT OFFICE.

JOHN C. TUNNICLIFF, OF MOLINE, ILLINOIS, ASSIGNOR TO D. M. SECHLER CARRIAGE COMPANY, OF MOLINE, ILLINOIS, A CORPORATION OF ILLINOIS.

PLANTER.

No. 799,022.  Specification of Letters Patent.  Patented Sept. 5, 1905.

Application filed August 22, 1904. Serial No. 221,765.

*To all whom it may concern:*

Be it known that I, JOHN C. TUNNICLIFF, a citizen of the United States, residing at Moline, in the county of Rock Island and State of Illinois, have invented certain new and useful Improvements in Planters, of which the following is a specification, reference being had to the accompanying drawings.

My invention relates to seeding devices; and it has especially to do with devices adapted for planting corn, although my improvements may be applied to any use to which they are adapted.

One of the objects of my invention is to provide a new and improved construction for disk planters by which the disks may be readily adjusted to vary the character of the furrow opened. For example, under certain conditions it is desirable to open a broad furrow, and in others it is desirable to throw the soil out farther to one side than to the other, and at other times to open a comparatively narrow furrow without throwing the soil out at the sides, so that it may fall back to a greater or less extent upon the seed, and my improved machine is designed to provide for securing these different arrangements at pleasure.

Another object is to provide a construction by which the planter can readily be provided with new axles and hubs when the old ones are worn out, thus avoiding the objections to the use of former contructions in which the part which supports the disk has been made solid with the shank of the planter.

A further object is to provide new and improved means for cutting down the ridge usually left by the furrow-opener disks of disk planters.

I accomplish these objects as illustrated in the drawings and as hereinafter described. What I regard as new is set forth in the claims.

In the accompanying drawings, Figure 1 is a side elevation of a corn-planter furrow-opener and shank or seed-tube with the operating parts usually carried thereby. Fig. 2 is a side view of a lower portion of the furrow-opener shank, which also forms the seed-tube. Fig. 3 is a partial vertical section on line 3 3 of Fig. 1. Fig. 4 is a horizontal section on line 4 4 of Fig. 1. Figs. 5 and 6 are horizontal sectional views similar to Fig. 4, showing other arrangements of the furrow-opener disks. Figs. 7 and 8 are side views of the two forms of axles which support the disks. Fig. 9 is a bottom view of the hub shown in Fig. 8. Fig. 10 is a side view of one of the cap-disks, and Fig. 11 is a bottom view thereof.

Referring to the drawings, 12 indicates the seed-tube or shank which supports the furrow-opener disks 13 14. The upper portion of said shank is arranged to be attached to the usual furrow-opener frame of the planter and contains any preferred form of mechanism for controlling the dropping of the seed. As such mechanism forms no part of my present invention, it is not deemed necessary or desirable to fully illustrate and describe it herein. At its lower end the shank 12 is provided with a projecting finger 15, which, as shown in Fig. 3, extends substantially to the level of the lower edges of the disks and lies centrally between them. As shown in Fig. 2, it is convex at the front. The object of this finger is to cut down the intermediate ridge left by the furrow-opener disks below the meeting-point of their forward edges, as will be understood by those familiar with the art.

At the point above and forward of the finger 15 the shank 12 is provided with inclined faces or seats 16 17, upon which are fitted the axles upon which the disks rotate, and, as shown in Fig. 2, said seats are provided with recesses 18 19, which receive suitable projections, hereinafter described, carried by said axles. Preferably the recesses 18 are rectangular and the recesses 19 circular; but their shape may be varied as desired. Their function is to prevent the rotation of the axles and to assist in holding them rigidly in position.

20 indicates a bolt which extends through a suitable opening 21 and serves to secure the various parts of the furrow-opener together.

22 indicates one form of axle adapted to be secured upon the seats 16 17, and 23 indicates another form of axle, also adapted to be secured upon said seats. The axle 22 is substantially conical in form and is provided with a base consisting of a disk 24, which is adapted to fit upon the seats 16 17. The inner face of said disk 24 is perpendicular to the longitudinal axis of the axle 22, so that the longitudinal axis of the axle 22 is substantially perpendicular to the seat upon which it is secured. The disk 24 is provided on its inner face with lugs 25 26, adapted to enter the recesses 18 19, and the axle 22 is provided with a passage $25^a$ for the bolt 20, as shown in Figs. 4 and 9. The axle 23 is provided with a similar passage, as indicated by dotted lines in Fig. 7, which, however, is at a different angle with the axis of the axle than the passage $25^a$. The axle 23 is also provided with a base-disk 27, the inner face of which is inclined with reference to the longitudinal axis of the axle 23, so that when in position on either of the seats 16 or 17 the longitudinal axis of the axle 23 is inclined from the perpendicular with reference to the seat, as shown in Fig. 6. The object of this construction is to vary the inclination of the disk relatively to the shank 12. The disk 27 is also provided with lugs 25 26. 28 indicates oil-ducts extending longitudinally of the axles 22 23. 29 indicates hubs which are adapted to be bolted or otherwise secured to either face of the disks 13 14. Said hubs are adapted to fit upon the axles 22 23 and are recessed at their outer ends to form inwardly-projecting shoulders 30, which are flush with the outer ends of the axles 22 23, as shown in Figs. 4, 5, and 6. 31 indicates cap-disks which are fitted in said recesses and bear upon said shoulders and upon the outer ends of the axles 22 23. Said cap-disks are provided with elongated orifices 32 for the passage of the bolt 20, and they are held securely down in position by nuts 33 screwed upon the ends of said bolt, as shown in said figures. The orifices 32 in the cap-disks are made elongated to permit of their being used with either of the axles 22 or 23.

34 indicates lugs on the under side of the cap-disks which fit in the upper ends of the oil-ducts 28 and serve to prevent the cap-disks from turning, as well as to close said ducts.

As illustrated in Figs. 4, 5, and 6, my improved furrow-opener is capable of three different arrangements. In Fig. 4 both disks are arranged with their concave surfaces outermost, as is necessary where a wide furrow is to be opened and the soil is to be thrown out equally at both sides. Fig. 5 illustrates what may be termed a "concavo-convex" arrangement and Fig. 6 a "double-convex" arrangement, the former being used where the soil is to be thrown out more at one side than the other and the latter where it is not desired to throw the soil excessively at either side, but rather to permit a greater or less part of it to fall back in the furrow. These different arrangements are secured by using one or the other of the axles 22 23 and correspondingly arranging the hubs 29. For example, with the arrangement shown in Fig. 4 the hubs are secured to the concave surfaces of the disks and the axles 22 are used. With the arrangement shown in Fig. 5 the left-hand disk and axle are the same as in Fig. 4, but the hub of the right-hand disk is secured to the convex surface thereof and the axle 23 is used. In the arrangement shown in Fig. 6 two axles 23 are used and both hubs are secured to the convex surfaces of the disks. These different arrangements may readily be attained by simply removing one or both nuts 33, which permits the removal of the disks and axles. The hubs may then be adjusted as desired and the parts assembled in their new relation. Obviously when by reason of wear any of the parts have become ineffective they may readily be replaced.

As illustrated in Figs. 4, 5, and 6, the disks are sharpened by beveling their edges on the concave surfaces thereof, which arrangement I find secures better results than where they are beveled on the convex surfaces.

I wish it to be understood that while I have described in detail the embodiment of my invention as illustrated in the accompanying drawings I do not restrict myself to such details of construction, except in so far as they are particularly claimed, as my invention includes generically the subject-matter of the broader claims.

That which I claim as my invention, and desire to secure by Letters Patent, is—

1. A furrow-opener, comprising a suitable support, oppositely-disposed axles removably secured thereto, concavo-convex furrow-opener disks, a hub removably secured to each of said disks and adapted to be secured to said disks at either side thereof, said hubs being adapted to fit on said axles, and means securing said parts together.

2. A furrow-opener, comprising a suitable support, a plurality of axles adapted to be secured thereto, the axes of said axles being inclined at different angles to said support, and means for removably securing said axles to said support.

3. A furrow-opener, comprising a suitable support, a plurality of axles adapted to be secured thereto the axes of said axles being inclined at different angles to said support, means for securing said axles to said support, and a furrow-opener disk adapted to be mounted on said axles.

4. A furrow-opener, comprising a suitable support, a plurality of axles having bases at different angles to their respective longitudinal axes, means for securing said axles to said support, and disks fitted on one or more of said axles.

5. A furrow-opener, comprising a suitable support, a plurality of axles having bases at different angles to their respective longitudinal axes, means for securing said axles to opposite sides of said support, and disks fitted on said axles.

6. A furrow-opener, comprising a suitable support having oppositely-disposed seats, axles fitted on said seats, said axles having bolt-passages at different angles to their respective axes, disks mounted on said axles, and a bolt connecting said parts together.

7. A furrow-opener comprising a suitable support, a plurality of axles having bases at different angles to their respective longitudinal axes, said axles having bolt-passages at different angles to their respective axes, and a bolt connecting said axles with said support.

8. A furrow-opener comprising a suitable support, having oppositely-disposed seats, axles fitted to said seats, said axles having bolt-passages at different angles to their respective axes, a bolt extending through said axles for connecting said parts together, and cap-disks secured by said bolt over the outer end of said axles.

9. A furrow-opener, comprising a shank, oppositely-disposed seats thereon, axles having bases at different angles to their respective longitudinal axes removably mounted on said seats, concavo-convex disks mounted on said axles, said disks having hubs adapted to be fitted to either surface thereof, and means for securing said parts together.

10. A furrow-opener, comprising a shank having a downwardly-projecting finger adapted to engage the intermediate ridge of soil, and a plurality of furrow-opener disks arranged in advance of said finger and having the forward portions of their edges in juxtaposition.

JOHN C. TUNNICLIFF.

Witnesses:
J. H. SAMUELS,
A. T. McELRAIN.